March 24, 1942.   E. O. P. THEGE   2,277,186
TORSIONAL VIBRATION DAMPER
Filed Nov. 9, 1934   4 Sheets-Sheet 1
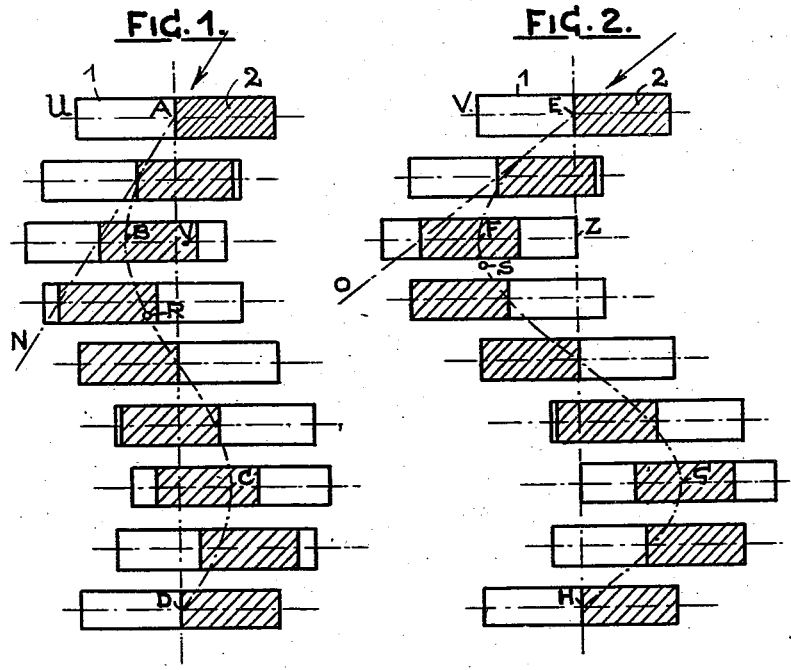
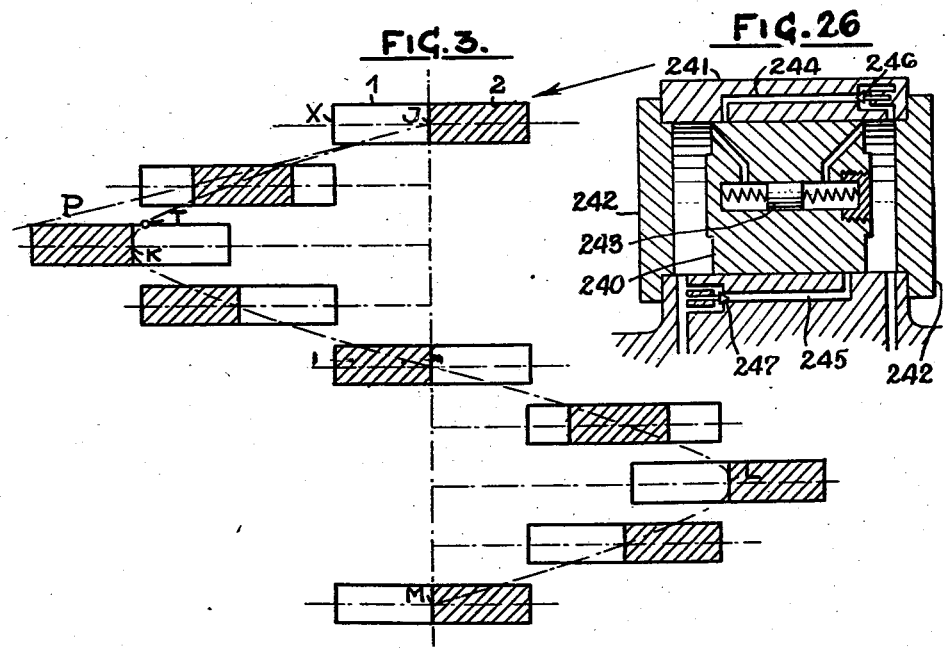
INVENTOR
Edwin Ossian Parcival Thege.

March 24, 1942.  E. O. P. THEGE  2,277,186

TORSIONAL VIBRATION DAMPER

Filed Nov. 9, 1934  4 Sheets-Sheet 2

INVENTOR
Edwin Ossian Percival Thege.

March 24, 1942. E. O. P. THEGE 2,277,186
TORSIONAL VIBRATION DAMPER
Filed Nov. 9, 1934 4 Sheets-Sheet 3
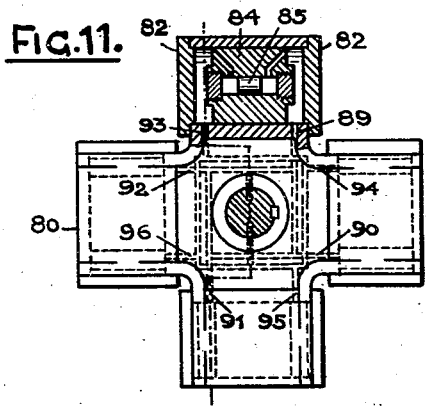
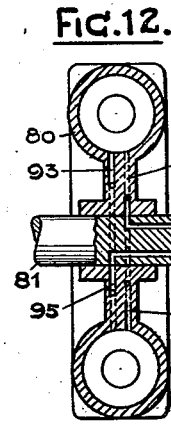
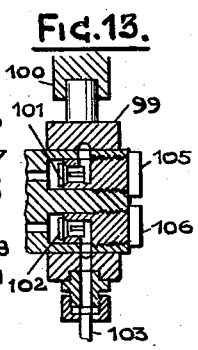
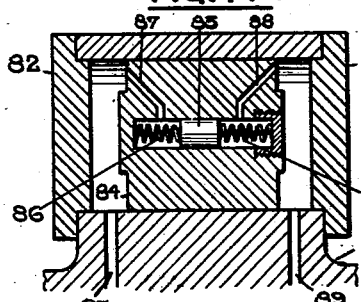
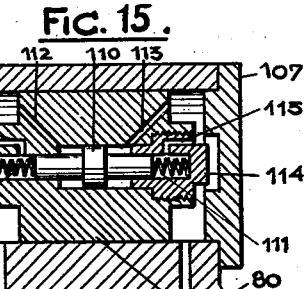
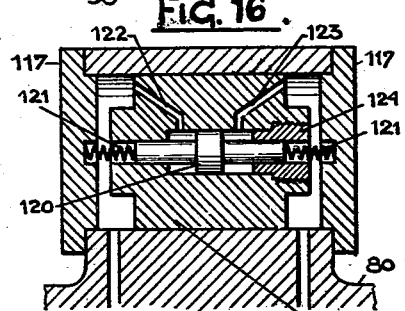
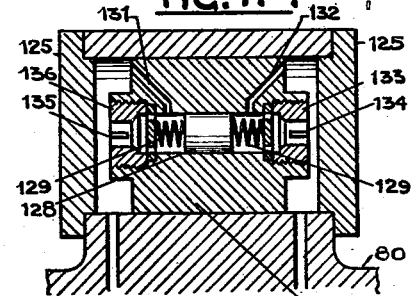
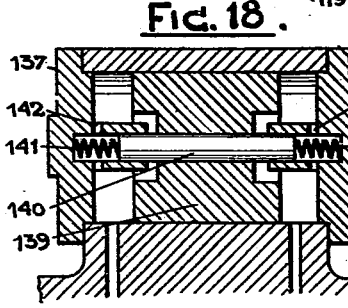
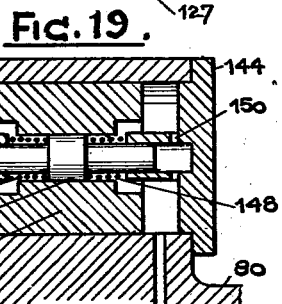
INVENTOR
Edwin Ossian Percival Thege.

March 24, 1942. E. O. P. THEGE 2,277,186
TORSIONAL VIBRATION DAMPER
Filed Nov. 9, 1934 4 Sheets-Sheet 4

INVENTOR
Edwin Ossian Percival Thege

Patented Mar. 24, 1942

2,277,186

UNITED STATES PATENT OFFICE 2,277,186

TORSIONAL VIBRATION DAMPER

Edvin Ossian Parcival Thege, Stockholm, Sweden

Application November 9, 1934, Serial No. 752,324
In Sweden December 4, 1933

7 Claims. (Cl. 74—604)

As is well known, each shaft system on which gyrating masses are fitted has a natural tendency to produce torsional vibrations of a certain periodicity. In order that such vibrations shall be produced it is only required that a shock or the like having a certain frequency, which stands in some even relation to the natural frequency of the shaft, acts torsionally on the shaft. Thus, it is a rule in the case of combustion engines that the varying tangential forces rouse the natural frequency of the shaft system when the impulses from the motor cylinders have a periodicity which in some way coincides with the natural frequency of the shaft.

As such a torsional movement of the shaft means a great risk for the durability of the shaft, special dampers of vibration have been constructed, which are fitted on the shaft.

The invention in question covers such a damper of torsional vibrations built according to a new principle. When the vibration here has reached a certain amplitude the same is damped in such a way that one or more masses that are free or almost free are brought to directly counteract the torsional vibration movement. The damper is fitted on the shaft on such a place where the deflection of the torsional vibration movement is comparatively large, and in its simplest form consists of a mass arranged at a radial distance from the shaft centre, and which it is possible to move practically freely in tangential, peripheral or similar direction between two stopping arrangements, consisting of silencing abutments such as liquid cushions or the like arranged on the shaft. During a torsional vibration motion of same the free mass is brought against one of the abutments. The mass is then given the same movement as that of the abutment. When the velocity of the abutment is reduced and its direction of motion is changed to the opposite, the free mass continues until it meets the second abutment. If the free stroke of the mass is suitably chosen in regard to the amplitude of the vibration, the free mass will meet the second abutment first when the direction of the oscillating motion is the opposite as compared with the motion of the mass. The latter will then have a damping effect on the torsional vibration motion, as from its motion in one direction the mass will be given an opposite direction of motion by the abutment.

By adopting a similar damper of torsional vibrations the great advantage is gained that the amplitude of the torsional deflection and accordingly the maximum stress in the shaft can be determined from the beginning. Another advantage is that the damper of vibrations has the same effect at all occurring vibrations. The damper is thus independent of the degree of vibration, etc.

The invention is shown on the accompanying drawings, illustrating some arrangements of same by way of example.

In Fig. 1, Fig. 2 and Fig. 3 it is diagrammatically shown how the free mass moves in relation to the abutments firmly fixed on the shaft.

Figs. 11 and 12 show an arrangement wherein a regulating piston for limiting the motion of the mass has been arranged in the free mass.

Fig. 13 illustrates an arrangement for admission of a liquid, oil for instance, to the interior of the damper.

Fig. 14 shows a section of the movable piston on a larger scale, as well as the regulating piston.

Figs. 15, 16 and 17 and Figs. 18 and 19 illustrate different arrangements of the regulating piston for limiting the stroke of the movable piston.

Figure 20:
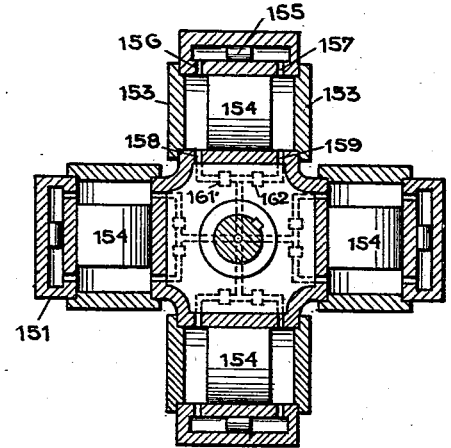
Figure 21:
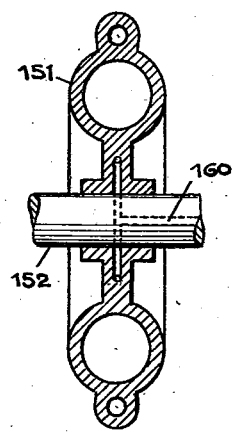

Figs. 20 and 21 likewise show an arrangement wherein the regulating piston for limiting the stroke is arranged within the part firmly fitted on the shaft.

Figs. 22, 23, 24, and 25 show different arrangements of the regulating piston, when the same is arranged within the firm part or housing.

Fig. 26 shows an arrangement for adjusting the piston automatically to the approximate centre position in the cylinder.

Fig. 1, Fig. 2 and Fig. 3 illustrate diagrammatically how the damper functions. It is assumed that an occurring vibration has a sinusoidal course in regard to time. In Fig. 1 the form of vibration in relation to time is indicated by the sinusoid ABCD. The oscillating part is marked I and consists of a tube shaped housing with closed ends, within which a free piston 2 can move freely between the two ends of the housing.

The different positions of the housing and piston are differently timed. It is assumed that in the initial position A, piston 2 rests against one of the ends of the housing and thus has the same velocity as the housing. If no friction or the like exists, this piston continues at constant speed in the direction of the line N, while the movement of the housing corresponds to the movement indicated by the sinusoid. The piston thus leaves the end of the housing and continues until the other end of the piston strikes the other end of the housing. This happens only when the centre point of the housing is at point R on the sinusoid, i. e., when the housing is on its retrogressive movement and its speed is accelerating. Upon the piston striking the end, the movement of the piston is reversed. This together with the subsequent acceleration requires a certain force which, results in a damping influence on the oscillating movement. The velocity of the movement is thus decreased and the next vibrational deflection thereby diminished.

The same process takes place at the subsequent vibration, with the result that the oscillating motion is further reduced until the vibration amplitude becomes so small that the piston has no further influence thereon.

Simultaneously with this direct influence of the piston an alteration of the natural frequency is also brought about when the piston is engaged and disengaged, which also contributes towards the cessation of the vibration.

Through suitable dimensioning of the free stroke and mass of the piston the deflection can thus be restricted to a certain amount, so that the stress in the shaft can be kept within permissible limits.

Fig. 1 illustrates the process when the piston's free stroke UA is double the amplitude BY of the oscillating movement.

Fig. 2 shows the process when the amplitude FZ of the vibrational deflection is equal to the unrestricted stroke of the piston. Accordingly the piston strikes the end of the housing when the vibration has reached point S. Even in this case the piston acts retardatively on the vibrational motion, and obviously stronger when the speed of the piston contrary to the vibrational motion is so much larger.

Fig. 3 illustrates the process when, in spite of the damping action indicated in Fig. 1 and Fig. 2, the vibrational deflection has been increased so that its amplitude at K is 3 times as large as the piston's free stroke XI. This happens, if the mass of the piston is not sufficiently large or if the free stroke of the piston is too small. If it is assumed, that there is no friction retarding the motion of the piston, the piston will strike the end of the housing at point T, i. e., before the oscillation is on its retrogressive movement. This, of course, is not at all suitable as in such a case the piston would temporarily assist to increase the vibrational deflection. By incorporating a liquid brake or the like the speed of the piston can be reduced so that the piston strikes the end at a later moment when the oscillation is on its retrogressive movement. It is of course better to dimension the mass and the free stroke so that the vibrational deflection is never allowed to develop to the indicated size.

As is clear from the diagrams the piston mass has no influence before the vibrational deflection has reached a certain size. According as the deflection is subsequently increased, the mass has a stronger effect, in view of the fact that the velocity of the latter is increased in the same measure as the deflection is increased.

In the foregoing description of the mode of action of the damper in question, it has been stated for the sake of simplicity that the movable mass strikes firm abutments in the piston chamber. In the case of practical operation of the damper such an arrangement is, however, quite unsuitable, as the knocking of mass on the abutments would result in a very disturbing noise. Moreover, difficulties would arise in view of the heat that would be developed, and also due to the resulting wear.

For the execution of a practically applicable damper it is necessary that the firm abutments be made silencing, by arranging liquid cushions on both sides of the movable mass or masses. Thus, the development of noise will be prevented, at the same time as the heat is more easily conducted to the surrounding parts.

The invention, which covers the arrangement of such silencing abutments as liquid cushions, can be applied to a great number of different arrangements. In the following some typical instances are dealt with, which, however, must not be regarded as the only ones possible.

Figure 4:
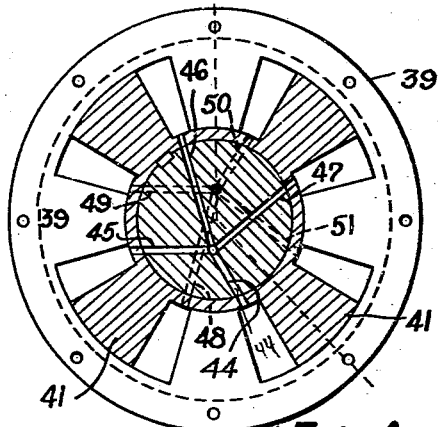
Fig. 4 and Fig. 5 show an arrangement where the movable mass can move peripherally in relation to the shaft.
Figure 5:
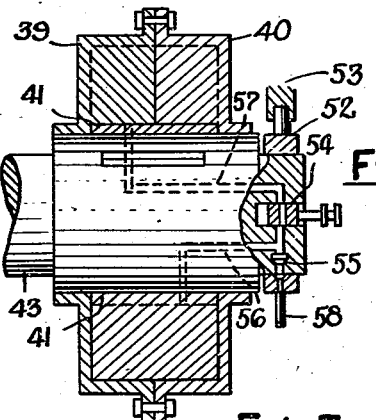

Figs. 4 and 5 illustrate an arrangement of the invention where the part 41 fixed on the shaft 43 is fitted with outwardly-protruding, winglike, rigid pistons with cylindrical surfaces arranged between them and also on the outer periphery of the pistons. The movable, outer, ring-shaped, housing part is composed of two halves 39 and 40, which are carried by the shaft 41 and fitted with inwardly-protruding, wing-like, rigid pistons arranged between the outwardly-protruding pistons of the part 41, so that cylinder chambers are formed between them. The two parts tighten against each other and the chambers between them are filled with a liquid (oil). By means of channels the cylinder chambers are connected to each other in such a way that all channels 44, 45, 46 and 47 on one side of the movable pistons are connected to a common channel 56, while the channels 48, 49, 50 and 51 on the other side of the same pistons are connected to a channel 57. By means of an adjustable slide 54 the two channels 56 and 57 respectively are connected to each other. The slide is adjustable from outside for which reason the channel area can be more or less choked even while the shaft is rotating. Admission of oil to replace leakage oil is effected by the piping 58 by means of a stationary bushing 52 carried by the shaft, and round the inner side of which a groove is cut. A non-return valve 55 prevents the oil from flowing back. The free motion of the movable outer ring is limited by its covering the ports leading into the cylinder chambers. The oil which is thus trapped between the pistons prevents further movement. The velocity of the motion of the movable ring can be adjusted by the aforementioned choking device in the channel passage.

It goes without saying that the oil can be admitted and that the channel area can be regulated in a similar way in the case of the other arrangements.

Figure 6:
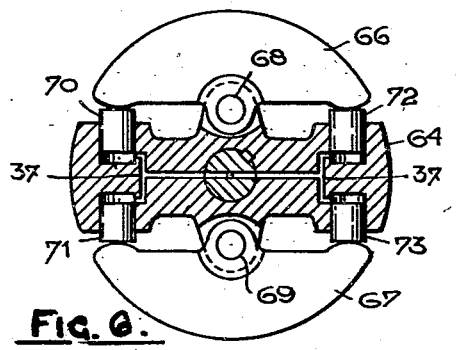
Figs. 6 and 7 show an arrangement where the masses move around pins eccentrically arranged in relation to the shaft.
Figure 7:
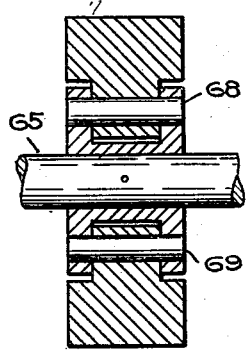

Figs. 6 and 7 illustrate an arrangement of the invention where the part 64 firmly fixed on the shaft 65 is provided with pins 68 and 69, on which the movable weights 66 and 67 are arranged. The motion of the weights 66 and 67 is regulated by the pistons 70 and 72, and 71 and 73 respectively, which are movable within the fixed part 64. The cylinder chambers are filled with oil and connected with each other through the connecting channels 37. The limiting of the stroke is effected when the pistons by their movement cover the channel orifices to the cylinder chambers.

Figure 8:
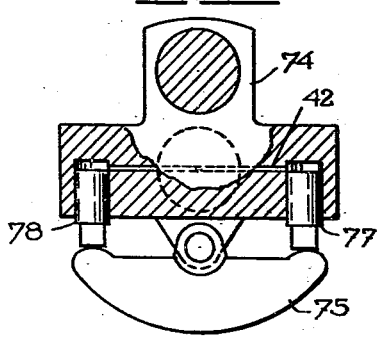
Figs. 8, 9 and 10 show an arrangement of the invention where the movable mass is fitted on a crank web and is movable around an eccentrically arranged pin.
Figure 9:
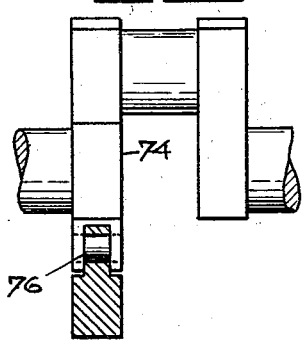
Figure 10:
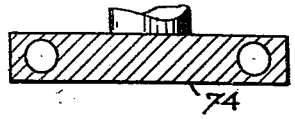

Figs. 8, 9, and 10 illustrate a similar arrangement as the one shown on Fig. 6 and Fig. 7. In this case, however, the fixed part consists of a crank web in a crank shaft 74. The movable weight 75 is here mounted on the pin 76, whereas the pistons 77 and 78 are arranged in the crank web. The cylinder chambers are filled with oil and the stroke is limited when the one or the other of the connecting channel 42 orifices to the cylinder chambers is closed by the movement of the pistons.

The amplitude of the torsional vibration is a measure of the extra stress appearing in the shaft system when a vibration takes place. It is therefore of importance that the vibrational deflections do not become too large.

In order that the stresses may be kept within reasonable limits, the shaft torsion must in many cases be kept at very small angular deflections—½° or less. In view of the fact that the free motion of the movable mass must be adapted according to the deflection of the oscillating movement, as has been pointed out before, the same must also in most cases be relatively small. If, therefore, this movement is adjusted by a liquid cushion the regulating port orifices in the cylinder chambers must be arranged very close to the covering edges of the piston, which naturally might cause difficulties. In this case the device must be manufactured with the utmost accuracy. Special arrangements are necessary to counteract this inconvenience. An increase of the movement is required. By adopting special regulating pistons, having a smaller diameter than the movable larger piston, this is effected in the best and simplest way. A movement of the latter piston results in a forcing aside of oil which, if admitted to a smaller piston, causes a considerable axial displacement of the same. Fig. 11 to Fig. 25 inclusive illustrate arrangements with such regulating pistons.

In the case of the arrangements shown in Fig. 11 to Fig. 17 inclusive the regulating piston is built into the movable mass or piston.

By way of example Fig. 11 and Fig. 12 as well as the detail section Fig. 14 drawn on a larger scale show a damper having the aforementioned regulating pistons arranged in the movable pistons. The housing 80 fixed on the shaft 81 incorporates four cylinder bores, in which the pistons 84 can move forwards and backwards. The cylinder bores are closed by means of the two covers 82. Inside the piston 84 an enclosed cylinder bore is fitted, in which the regulating piston 85 is allowed to move forwards and backwards. This piston is provided with springs 86 on both sides which tends to keep it in the centre position. The inner cylinder bore of the piston 84 is connected to the outer cylinder chambers by means of the channels 87 and 88. These as well as other cavities are filled with a liquid, preferably oil, which is prevented from flowing back through the filling ports 89 and 93 by the non-return valves 101 and 102. The diameter of the piston 84 being considerably larger than that of the regulating piston 85 a small axial movement of the large piston 84 corresponds to a relatively big axial movement of the regulating piston 85. Thus, if the chambers are entirely filled with oil, the same is pressed from the one large cylinder chamber into the smaller cylinder chamber, at a displacement of piston 84, thereby moving the regulating piston 85, until the connecting port to the other large cylinder chamber is covered by the regulating piston 85, when it is impossible to move the piston 84 any further. It is in this way possible to exactly determine the free motion of the large piston, even if the motion should be very small.

In Fig. 11 and Fig. 12 it is shown by way of example that the inlet channels to one side of all pistons, viz., 89, 90, 91 and 92, are connected to each other and to the inlet channel 97 in the shaft, whereas the inlet channels 93, 94, 95 and 96 to the other side of the pistons are connected to the inlet channel 98 in the shaft. The non-return valves 101 and 102 prevent the oil from flowing back, which is admitted from outside through a groove cut in the stationary bushing 99.

As it may be imagined that piston 85 moves too far out over the inlet ports 87 and 88, respectively, so that it is not possible for the oil to flow against this piston, which might happen if air is drawn in with the oil, the regulating piston 110 on Fig. 15 is arranged as a piston with double piston surfaces on either side. By means of the channels 112 and 113 respectively the outer, ringshaped piston surfaces are in permanent connection with the larger cylinder chambers, whereas the two ends of the piston function as regulating pistons by covering the orifices of the ports 115 and 116 respectively. By this arrangement the oil pressure always acts on the ringshaped piston surfaces, so that it is ensured that the regulating piston will always carry out the intended motion.

Fig. 16 shows an arrangement serving the same purpose. In this case, however, the two ends of the piston are in permanent connection with the two cylinder chambers, whereas the ring-shaped piston part functions as the proper regulating piston by covering the orifices of the ports 122 and 123 respectively.

Fig. 17 shows a somewhat altered arrangement. Here the regulating piston 129 is arranged as a simple cylindrical piston. The regulation is effected by covering of the orifices 131 and 132 respectively, while the two cylinder chambers can also communicate with the cylinder chambers of the regulating piston by means of the valves 135 and 134 opening inwards towards the latter. In this manner the same effect is gained as with the arrangements on Fig. 15 and Fig. 16.

On Fig. 18 and Fig. 19 two examples are shown where the regulating piston is arranged in combination both with the movable piston and the fixed part, in these cases the covers 137 shutting the cylinder bore. Thus, on Fig. 18 the regulating piston 140 is movable both within the piston 139 and within the cylinder bores arranged in the covers 137. The motion of piston 139 is arrested when the regulating piston covers the ports 142 respectively 143.

Fig. 19 shows a similar arrangement. In this case, however, the regulating piston is designed as a piston with double piston surfaces. The ring shaped piston surfaces are in permanent connection with the two cylinder chambers of the larger piston.

Fig. 20 to Fig. 25 inclusive illustrate different arrangements with the regulating piston fitted within the housing firmly fixed on the shaft.

Figure 22:
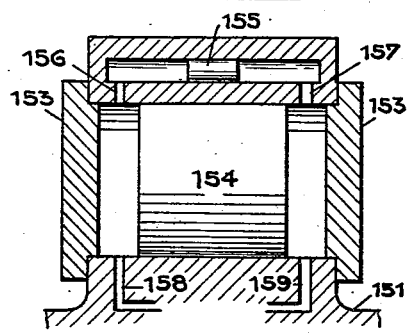

Figs. 20 and 21 and the detailed section shown on larger scale in Fig. 22 illustrate a damper in which the fixed housing 151 is keyed on to the shaft 152. The pistons 154 move within cylinder bores closed by means of the covers 153. The regulating pistons 155, which also move in enclosed cylinder bores, limit the amplitude of the movement of the pistons 154 by covering the orifices of the channels 156 and 157 respectively leading to the larger cylinder chambers. The filling channels 158 and 159, respectively, on either side of the pistons 154 are here provided with a non-return valve each, 161 and 162 respectively.

Figure 23:
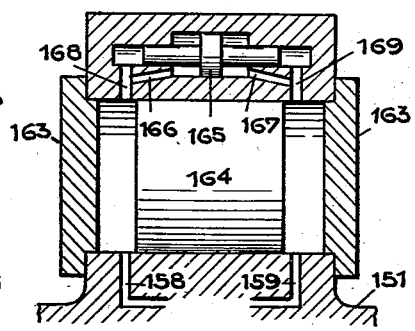
Figure 24:
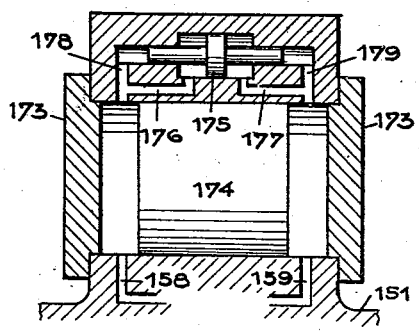

Fig. 23 shows an arrangement where the regulating piston consists of a piston 165. In the case of this arrangement the ringshaped piston surfaces are in permanent connection with the cylinder chambers of the larger piston 164, so as to ensure that the intended motion is carried out by the regulating piston, while the two ends of the piston act as regulating organs by covering the orifices of the channels 168 and 169 respectively, leading to the cylinder chambers of the larger piston 164.

Fig. 24 again shows a similar arrangement where the two ends of the regulating piston 175 are in permanent connection with the two cylinder chambers of the larger piston, while the ringshaped piston part serves as a regulating organ by covering the ports 176 and 177 respectively, leading to the two cylinder chambers.

Figure 25:
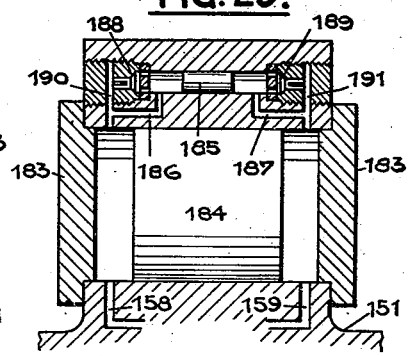

Finally, Fig. 25 illustrates an arrangement where the two cylinder chambers of the larger piston 184 are in permanent connection with the regulating piston 185 by means of the valves 188 and 189, respectively, opening inwardly, whereas the limiting of the larger piston's motion is effected by covering of the orifices in the cylinder bore of the ports 186 and 187 respectively, leading to the cylinder chambers of the larger piston.

The common principle for the different arrangements as per Fig. 11 to Fig. 25 inclusive for limiting the motion of the mass by means of regulating pistons is that the cylinder chambers of the smaller regulating piston are connected to the cylinder chambers of the larger piston by channels or the like. For the limiting of the stroke of the regulating piston only liquid cushion arrangements have been shown. It is, however, also possible to arrange firm or elastic abutments for this purpose, by which the motion of the regulating pistons would be stopped, or to provide the actual regulating pistons with abutments. It is however most appropriate to use liquid cushions, shocks and knocks being thus avoided.

In the case of the arrangements with a movable piston and liquid-filled cylinder chambers previously described it is conceivable that, due to leakage of oil from one cylinder chamber to the other, the piston will eventually move towards one end of the cylinder bore. This particularly will take place if no oscillating motions occur during a considerable time of operation of the damper. By providing springs excessive movement of the piston can be prevented. Other special arrangements can, however, also be adopted to ensure that the piston keeps in the centre position.

As shown on Fig. 26 for instance, two channels 244 and 245, respectively, might be arranged in the housing. Each channel connects one of the cylinder chambers to a port orifice in the cylinder bore, located a little way in underneath that end of piston 240 which is opposite in relation to the same cylinder chamber, when the piston 240 is in its normal centre position. In the channels non-return valves, 246 and 247 respectively, are fitted, allowing liquid to pass from the port orifices covered by the piston to the respective cylinder chambers, but not in the opposite direction. If the piston moves so far towards one side that one of the port orifices below the piston is uncovered and there is accordingly more liquid in one cylinder chamber than in the other, liquid will flow over from the chamber with the larger quantity of liquid to the other chamber, when by vibration the piston will receive such a motion that it exerts a pressure on this liquid. Thus, regulation is automatically effected.

In the case of all the different arrangements shown the pistons can also be supported by springs on each side, whereby it is ensured that the pistons remain in centre position while oil is being filled in. In order that the springs may not be able to exert an unfavourable influence, they must be comparatively weak, the desired action not being attained by fitting stronger springs. In such a case certain vibrations would occur also between the movable mass and the housing, which sometimes may be to advantage but in other cases may be a drawback. If no springs are used, the mode of action always remains the same also at different natural frequencies. A damping of the oscillating movement always takes place.

It is natural that the various arrangements shown can be combined differently with the respective arrangements. Thus the arrangements from Fig. 4 to Fig. 10 for instance can also be provided with regulating pistons for limiting the amplitude of the motion.

I do not wish to be limited as to details of construction, as these may be modified in many particular parts without departing from the spirit of my invention.

Certain subject matter shown and described, but not claimed herein, constitutes claimed subject matter in my continuation application Serial No. 331,985, filed April 27, 1940.

Having thus described my invention, what I claim and desire to secure by Letters Patent is:

1. In a torsional vibration damper, a torsionally vibratory rotatable member, vibration dampening means including a second member providing inertia mass, said second member being carried by said rotatable member, said second member having limited movement between terminal positions with respect to said rotatable member, and means for determining said terminal positions including a primary fluid chamber formed in one of said members, the other of said members comprising a piston movably disposed in said chamber, a secondary fluid chamber formed in one of said members and having a substantially smaller cross sectional area than said primary chamber, a secondary piston movably positioned in said secondary chamber, means forming a passageway connecting said primary chamber with said secondary chamber at one side of said secondary piston, and means comprising an outlet port in said secondary chamber at the opposite side of said secondary piston, said outlet port being arranged to be substantially completely closed by said secondary piston in a terminal position thereof whereby movement of said secondary piston relative to the member containing said secondary chamber is stopped due to fluid trapped in said secondary chamber upon closure of said port, the stopping of said secondary piston serving to stop said primary piston, due to fluid trapped between said pistons.

2. In a torsional vibration damper, a torsionally vibratory rotatable member, vibration dampening means including a second member providing inertia mass, said second member being carried by said rotatable member, said second member having limited movement between terminal positions with respect to said rotatable member, and means for determining said terminal positions including a primary fluid chamber formed in one of said members, the other of said members comprising a piston movably disposed in said chamber, a secondary fluid chamber formed in one of said members and having a substantially smaller cross sectional area than said primary chamber, a secondary piston movably positioned in said secondary chamber, a port formed in said secondary chamber at each of opposite sides of said secondary piston, and means forming passageways connecting said respective ports with said primary chamber at opposite sides of the primary piston therein, said respective ports being arranged to be substantially completely closed by said secondary piston in opposite terminal positions thereof whereby movement of said secondary piston relative to the member containing said secondary chamber is stopped due to fluid trapped in said secondary chamber upon closure of either of said ports, the stopping of said secondary piston serving to stop said primary piston due to fluid trapped between said pistons and acting through the other of said ports.

3. A torsional vibration damper as defined in claim 2 including resilient centering means at each end of said secondary piston adapted to maintain said secondary piston in a central position between said ports.

4. In a torsional vibration damper, a torsionally vibratory rotatable member, vibration dampening means including a second member providing inertia mass, said second member being carried by said rotatable member, said second member having limited movement between terminal positions with respect to said rotatable member, and means for determining said terminal positions including a primary fluid chamber formed in one of said members, the other of said members comprising a piston movably disposed in said chamber, a secondary fluid chamber formed in one of said members and having a substantially smaller cross sectional area than said primary chamber, a secondary piston movably positioned in said secondary chamber, a port formed in said secondary chamber at each of opposite sides of said secondary piston, and means forming passageways connecting said respective ports with said primary chamber at opposite sides of the primary piston therein, said respective ports being arranged to be substantially completely closed by said secondary piston in opposite terminal positions thereof whereby movement of said secondary piston relative to said primary piston is stopped due to fluid trapped in said secondary chamber upon closure of either of said ports, the stopping of said secondary piston serving to stop said primary piston due to fluid trapped between said pistons and acting through the other of said ports.

5. In a torsional vibration damper, a torsionally vibratory rotatable member, vibration dampening means including a second member providing inertia mass, said second member being carried by said rotatable member, said second member having limited movement between terminal positions with respect to said rotatable member, and means for determining said terminal positions including a primary fluid chamber formed in one of said members, the other of said members comprising a piston movably disposed in said chamber, a secondary fluid chamber formed in the same member in which the primary chamber is formed, said secondary chamber having a substantially smaller cross-sectional area than said primary chamber, a secondary piston movably positioned in said secondary chamber, a port formed in said secondary chamber at each of opposite sides of said secondary piston, means forming passageways connecting said respective ports with said primary chamber at opposite sides of the primary piston therein, said respective ports being arranged to be substantially completely closed by said secondary piston in opposite terminal positions thereof whereby movement of said secondary piston relative to said same member in which said chambers are formed is stopped due to fluid trapped in said secondary chamber upon closure of either of said ports, the stopping of said secondary piston serving to stop said primary piston due to fluid trapped between said pistons and acting through the other of said ports.

6. In a torsional vibration damper, a torsionally vibratory rotatable member, vibration dampening means including a second member providing inertia mass, said second member being carried by said rotatable member, said second member having limited movement between terminal positions with respect to said rotatable member, and means for determining said terminal positions including a primary fluid chamber formed in one of said members, the other of said members comprising a piston movably disposed in said chamber, a secondary fluid chamber having a bore comprising like end portions and a central portion of different diameter formed in one of said members, a secondary piston movably positioned in said secondary chamber, said secondary piston having portions of different diameters, a port formed in the central of said bore portions at each of opposite sides of the piston portion disposed therein, the bore portion in which said ports are formed having a substantially smaller cross-sectional area than said primary chamber, means forming passageways connecting the respective ports with said primary chamber at opposite sides of said primary piston therein, said respective ports being arranged to be substantially completely closed by said piston portion in opposite terminal positions thereof whereby movement of said secondary piston relative to the member containing said secondary chamber is stopped due to fluid trapped in said portion of said secondary chamber upon closure of either of said ports, the stopping of said secondary piston serving to stop said primary piston due to fluid between said pistons acting through the other of said ports, and means forming continuously open passages connecting said primary chamber at opposite sides of said primary piston with said end portions of said bore at opposite sides of said piston portion therein.

7. In a torsional vibration damper, a torsionally vibratory rotatable member, vibration dampening means including a second member providing inertia mass, said second member being carried by said rotatable member, said second member having limited movement between terminal positions with respect to said rotatable member, and means for determining said terminal positions including a primary fluid chamber formed in one of said members, the other of said members comprising a piston movably disposed in said chamber, a secondary fluid chamber having a bore comprising like end portions and a central portion of larger diameter formed in one of said members, at least the smaller portion of said bore having a substantially smaller cross-sectional area than said primary chamber, a secondary piston movably positioned in said secondary chamber, said secondary piston having portions of different diameters, a port formed in each of said end portions of said bore at each of opposite sides of the smaller piston portion disposed therein, means forming passageways connecting the respective ports with said primary chamber at opposite sides of said primary piston therein, said respective ports being arranged to be substantially completely closed by said smaller piston portion in opposite terminal positions thereof whereby movement of said secondary piston relative to the member containing said secondary chamber is stopped due to fluid trapped in said smaller bore portion upon closure of either of said ports, the stopping of said secondary piston serving to stop said primary piston due to fluid trapped between said pistons and acting through the other of said ports, and means forming continuously open passages connecting said primary chamber at opposite sides of said primary piston, with said larger bore portion at opposite sides of the larger of said piston portions therein.

EDVIN OSSIAN PARCIVAL THEGE.